UNITED STATES PATENT OFFICE.

ANTON MIKOLAJCZAK, OF KASTROP, GERMANY.

DINITROGLYCERIN EXPLOSIVE AND PROCESS OF MAKING.

No. 910,936.　　　Specification of Letters Patent.　　　Patented Jan. 26, 1909.

Original application filed April 18, 1904, Serial No. 203,762. Divided and this application filed October 25, 1904. Serial No. 229,961.

*To all whom it may concern:*

Be it known that I, ANTON MIKOLAJCZAK, a subject of the King of Prussia, residing at Kastrop, in the Province of Westphalia and German Empire, have invented a new and useful Dinitroglycerin Explosive and Process of Making It, of which the following is a specification.

This invention relates to the manufacture of explosives containing dinitroglycerin and is a division of my application Ser. No. 203,762, upon which Patent No. 798,436 was issued to me on Aug. 29, 1905.

According to the practice prevailing in the manufacture of dynamite, carbonite and other nitroglycerin explosives prior to my invention the necessary nitroglycerin is prepared in the form of trinitroglycerin of as pure a character as possible, by "nitroglycerin" the glycerin tri-nitrate $C_3H_5(O.NO_2)_3$ being understood.

This nitroglycerin, also known as "blasting oil", according to the ordinary method of preparation may unintentionally have been mixed with a small quantity of less nitrated compound glycerin ethers or dinitroglycerin, but the presence of the lower nitrates in the trinitroglycerin has been a matter of conjecture rather than proof and they have been supposed to be a detriment to the explosive. I am the first to have isolated dinitroglycerin and studied its properties, and have discovered means of producing and isolating it; and I have also discovered its many desirable and highly valuable characteristics in employing it in the manufacture of explosives.

The disadvantages adhering to nitroglycerin consist in the high sensibility of the substance to mechanical shocks and heat, in the readiness with which it freezes, and the like. They lead to difficulties both in its manufacture and in its application and are the cause of many accidents.

For the purpose of removing these disadvantages, a number of processes have been invented. I may mention here that of mixing nitro-benzol, amyl-nitrate, etc. Most of these processes, however, have proved a total failure, while others have not been employed with real success in practice.

In the employment of dinitroglycerin $$C_3H_5(O.NO_2)_2OH,$$

 process of manufacturing explosives which offers great advantages over the processes referred to for the following reasons:—

1. Dinitroglycerin is a considerably more stable compound than the extremely unstable blasting oil, trinitroglycerin, $$C_3H_5(O.NO_2)_3.$$

It is, therefore, much less sensible to shock and heat than the latter. Pure dinitroglycerin does not explode on ignition at all. By adding a gradually increasing percentage of dinitroglycerin to trinitroglycerin, the dangerous characteristics of the latter can be more and more diminished.

2. Dinitroglycerin can be prepared altogether without danger, since any decomposition accidentally occurring in the course of manufacture, even in the case of very large quantities, does not cause explosion, as numerous experiments, where decomposition has been purposely brought about, have proved.

3. Dinitroglycerin for all practical purposes may be considered as uncongealable. Its addition to trinitroglycerin lowers the freezing-point of the latter to such an extent that a mixture of, for instance, 60% dinitro- and 40% trinitroglycerin was found to remain perfectly fluid during severe frost, while nitroglycerin lixiviated from commercial dynamites, as well as the latter themselves, froze completely under the same experimental conditions.

4. By the selection of suitable quantities of dinitroglycerin and ordinary blasting oil, an oil can be produced superior to ordinary blasting oil in explosive power. For "nitroglycerin" contains more oxygen than is necessary for a complete combustion of its carbon to carbonic acid, and of its hydrogen to water, while dinitroglycerin contains too little. Thus, by mixing these two compound ethers a product equalizing these two conditions can be obtained, which may be regarded as an ideal blasting oil and whereby the greatest possible explosive force is obtained.

5. What has been said in paragraphs 1, 3 and 4 in respect to dinitroglycerin and its mixtures with blasting-oil naturally applies also to all explosives prepared from the same for shooting and blasting purposes. In the case of such explosive powders for shooting or military purposes there is the additional advantage that on account of the lower temperature of the generated gases, which are also much more slowly generated, the barrel of the gun is attacked to a much less degree than in the case of the well-known nitroglycerin powders.

6. Dinitroglycerin is readily soluble in every proportion in nitroglycerin, and any suitable mixture of di- and trinitroglycerin can be prepared directly.

7. Dinitroglycerin is just as good a solvent and gelatinizing medium for various substances such as nitro-cellulose, xyloidin, etc. as is trinitroglycerin.

The following examples of explosives may be here given:— a. 61.0% dinitroglycerin
   1.8% soluble pyroxylin
  30.0% potassium nitrate
   7.2% wood-meal
  ———
  100.0% b. 38.4% dinitroglycerin
  25.6% blasting-oil (trinitroglycerin)
   1.7% soluble pyroxylin
  27.0% sodium nitrate
   7.3% wood-meal
  ———
  100.0% c. 17.0% dinitroglycerin
  58.0% blasting-oil
  23.0% infusorial earth (kieselguhr)
   2.0% chalk
  ———
  100.0% d. 50.0% dinitroglycerin
  49.0% soluble pyroxylin
   1.0% di-phenylamin
  ———
  100.0% e. 20.0% dinitroglycerin
  80.0% soluble pyroxylin
  ———
  100.0% f. 40.0% dinitroglycerin
  10.0% blasting-oil
  49.0% soluble pyroxylin
   1.0% di-phenylamin
  ———
  100.0% g. 12.0% dinitroglycerin
   8.0% trinitroglycerin
  79.0% nitro-starch
   1.0% di-phenylamin
  ———
  100.0% h. 7.5% dinitroglycerin
  42.5% trinitroglycerin
  49.0% soluble pyroxylin
   1.0% di-phenylamin
  ———
  100.0% i. 45.0% dinitroglycerin
  30.0% trinitroglycerin
   2.0% chalk
  23.0% infusorial earth (kieselguhr)
  ———
  100.0% k. 41.0% dinitroglycerin
  34.0% trinitroglycerin
   1.0% chalk
  24.0% infusorial earth (kieselguhr)
  ———
  100.0% l. 14.0% dinitroglycerin
  78.0% trinitroglycerin
   8.0% soluble pyroxylin
  ———
  100.0% m. 12.5% dinitroglycerin
  62.5% trinitroglycerin
   1.0% chalk
  24.0% infusorial earth (kieselguhr)
  ———
  100.0%

As an example of my method of manufacturing dinitroglycerin I may cite the following: To 10 parts by weight of glycerin, 1.262 spec. gr., 33 parts by weight of nitric acid, 1.50 spec. gr. are added, either by allowing the nitric acid to slowly flow into the glycerin, or the glycerin into the nitric acid. During this operation the two liquids are thoroughly mixed by stirring and the temperature of the mixture is kept preferably below 17° to 18° C. The mixture containing chiefly mono-nitroglycerin is then allowed to stand for some time (it may be several hours) by preference at a temperature not above 20° C., until the mono-nitroglycerin is converted into dinitroglycerin. The entire mass is then diluted with about 10 parts by weight of cold water and the nitric acid neutralized by a suitable agent until the lye, for example in case of using carbonate of lime for neutralization has a specific gravity of 1.58. The dinitroglycerin rises therein, and can be readily separated, purified and dried.

Any dinitroglycerin which may remain in the lye can be readily removed by means of a solvent, such as ether, and obtained from the latter by distillation. If desired, the mixture of oil and lye deprived of acid, can be treated in the same manner without prior separation, no technical difficulties being presented.

Dinitroglycerin is obtained as a colorless oil, when the glycerin and the nitric acid are colorless, that is to say free from impurities. It is soluble in water to a large extent and by reason of this property can very well be obtained quite pure, for instance, by fractional evaporation of the water. The well-known solvents for nitroglycerin also readily absorb dinitroglycerin. The percentage of nitrogen according to calculation is 15.38; an actual analysis (nitrometer and organic analysis) showed the average to be 15.38 per cent.

If mixtures of dinitroglycerin with trinitroglycerin are employed for manufacturing explosives or gun powder, the dinitroglycerin can first be prepared separately and then mixed. If, however, a suitable mixture of nitric acid and sulfuric acid of certain nitrifying efficiency or nitration value is made, said mixture may be used for preparing and obtaining direct a mixture of both the tri-nitroglycerin and the dinitroglycerin, i. e. a mixture containing the desired percentage of dinitroglycerin.

To manufacture explosives for commercial use from dinitroglycerin, or a mixture of di- and tri-nitroglycerin, which are comparatively mobile liquids, it is necessary, to either absorb the liquid in a suitable material, or thicken it by a gelatinating medium. The bodies obtained by either of these processes are mixed with a solid inorganic oxidizing salt, such as the nitrates of sodium, potassium, ammonium, barium, or chlorates, perchlorates, etc., preferably in finely powdered form, in a suitable kneading apparatus. The dough-like mass is fed into a cartridge machine.

The process of manufacturing such a mixture of glycerin nitrates is more fully described and claimed in my co-pending application, Serial No. 239,732, filed January 5th, 1905.

What I claim as my invention and desire to secure by Letters Patent is:—

1. In the process of manufacturing explosives the step which consists in dissolving gelatinating media in dinitroglycerin to increase its viscosity.

2. The process of manufacturing explosives which consists in dissolving gelatinating media in dinitroglycerin and incorporating solid inorganic oxidizing salt, with said mixture.

3. The process of manufacturing explosives which consists in dissolving gelatinating media in dinitroglycerin, incorporating solid inorganic oxidizing salt therewith and adding to said mixture carbonaceous material.

4. In the process of manufacturing explosives the step which consists in dissolving gelatinating media in a mixture of di- and tri-nitroglycerin to increase its viscosity.

5. The process of manufacturing explosives, which consists in dissolving gelatinating media in a mixture of di- and tri-nitroglycerin and incorporating solid inorganic oxidizing salt therewith.

6. The process of manufacturing explosives, which consists in dissolving gelatinating media in a mixture of di- and tri-nitroglycerin, incorporating solid inorganic oxidizing salt therewith and adding thereto carbonaceous material.

7. As a new article of manufacture an explosive containing dinitro-glycerin, solid inorganic oxidizing salt, and carbonaceous material, the dinitro-glycerin constituting at least three per cent. of the explosive liquid constituents.

8. As a new article of manufacture an explosive, consisting of a mixture of di- and tri-nitroglycerin and a solid inorganic oxidizing salt, and carbonaceous material ·

In testimony whereof I have signed my name to this specification in the presence of two subscribing witnesses.

ANTON MIKOLAJCZAK.

Witnesses:
 PAUL MÜLLER,
 LUDWIG KLEIN.